(12) United States Patent
Roberts

(10) Patent No.: US 9,073,462 B2
(45) Date of Patent: Jul. 7, 2015

(54) IN-SITU FOAM CORE VEHICLE SEATING SYSTEM AND METHOD OF MANUFACTURE

(76) Inventor: Richard W. Roberts, Tecumseh, MI (US)

(*) Notice: Subject to any disclaimer, the term of this patent is extended or adjusted under 35 U.S.C. 154(b) by 326 days.

(21) Appl. No.: 13/463,682

(22) Filed: May 3, 2012

(65) Prior Publication Data
US 2013/0257119 A1    Oct. 3, 2013

Related U.S. Application Data

(60) Provisional application No. 61/616,988, filed on Mar. 28, 2012.

(51) Int. Cl.
*B60N 2/64* (2006.01)
*B60N 2/427* (2006.01)
*B60N 2/70* (2006.01)

(52) U.S. Cl.
CPC ...... *B60N 2/427* (2013.01); *B60N 2/64* (2013.01); *B60N 2/7017* (2013.01); *B60N 2/42709* (2013.01)

(58) Field of Classification Search
CPC .. B60N 2/42745; B60N 2/4228; B60N 2/427; B60N 2/64; B60N 2/7017
USPC ............. 297/216.14, 216.13, 452.61, DIG. 1
See application file for complete search history.

(56) References Cited

U.S. PATENT DOCUMENTS

| | | | |
|---|---|---|---|
| 776,342 A | 11/1904 | McCormick | |
| 1,588,778 A | 6/1926 | Sorensen | |
| 2,983,963 A | 5/1961 | Jodell et al. | |
| 3,062,337 A | 11/1962 | Zittle | |
| 3,111,787 A | 11/1963 | Chamberlain | |
| 3,132,417 A | 5/1964 | Irwin | |
| 3,277,220 A | 10/1966 | Plymale et al. | |
| 3,389,195 A | 6/1968 | Gianakos et al. | |
| 3,400,429 A | 9/1968 | Ludwig | |
| 3,466,700 A | 9/1969 | Harrison | |
| 3,468,097 A | 9/1969 | Mack | |
| 3,563,845 A | 2/1971 | Stevens | |
| 3,598,312 A | 8/1971 | Hamilton | |
| 3,745,998 A | 7/1973 | Rose | |
| 3,774,968 A * | 11/1973 | Fenton | 297/452.61 |
| 3,813,040 A | 5/1974 | Heinemeyer | |
| 3,935,044 A | 1/1976 | Daly | |

(Continued)

FOREIGN PATENT DOCUMENTS

| | | |
|---|---|---|
| EP | 0542302 | 5/1993 |
| JP | 58213028 | 12/1983 |

(Continued)

OTHER PUBLICATIONS

Vehicle Certification Agency Seat Strength Test Report, Oct. 25, 2007, Test Report ESH178571, pp. 1-6.*

(Continued)

*Primary Examiner* — Milton Nelson, Jr.
(74) *Attorney, Agent, or Firm* — Brooks Kushman P.C.

(57) ABSTRACT

A seating system for use with a vehicle includes a first seat component having a skin having a thermal bond to an in-situ foam core. The first seat component maximum displacement is less than 160 mm when tested according to a test method in ECE R17 regulation for luggage retention with a 20 times the force of gravity crash pulse. A method of manufacture the seat back system is also recited.

12 Claims, 4 Drawing Sheets

(56) References Cited

U.S. PATENT DOCUMENTS

| | | | |
|---|---|---|---|
| 4,361,656 A | 11/1982 | Mostafa | |
| 4,492,663 A | 1/1985 | Reinfeld et al. | |
| 4,546,899 A | 10/1985 | Williams | |
| 4,573,741 A * | 3/1986 | Kirchner-Carl | 297/452.18 |
| 4,651,494 A | 3/1987 | Van Wagoner | |
| 4,680,909 A | 7/1987 | Stewart | |
| 4,825,089 A | 4/1989 | Lindsay | |
| 4,840,973 A | 6/1989 | Kuwabara et al. | |
| 5,018,329 A | 5/1991 | Hasan et al. | |
| 5,028,377 A | 7/1991 | Hendry | |
| 5,055,350 A | 10/1991 | Neefe | |
| 5,093,053 A | 3/1992 | Eckardt et al. | |
| 5,252,270 A | 10/1993 | Haardt et al. | |
| 5,306,266 A | 4/1994 | Freeland | |
| 5,345,814 A | 9/1994 | Cur et al. | |
| 5,366,674 A | 11/1994 | Hattori et al. | |
| 5,505,810 A | 4/1996 | Kirby et al. | |
| 5,532,034 A | 7/1996 | Kirby et al. | |
| 5,665,285 A | 9/1997 | Hattori et al. | |
| 5,711,073 A | 1/1998 | Tippmann et al. | |
| 5,713,518 A | 2/1998 | Fox et al. | |
| 5,759,459 A | 6/1998 | Eckardt et al. | |
| 5,786,394 A | 7/1998 | Slaven | |
| 5,824,261 A | 10/1998 | Berdan | |
| 5,858,159 A * | 1/1999 | Holbrook et al. | 156/256 |
| 5,866,224 A | 2/1999 | Ang et al. | |
| 5,956,905 A | 9/1999 | Wiedrich | |
| 6,179,215 B1 | 1/2001 | Shea | |
| 6,196,760 B1 | 3/2001 | Sinclair | |
| 6,230,981 B1 | 5/2001 | Hill et al. | |
| 6,241,926 B1 | 6/2001 | Cutler | |
| 6,375,892 B2 | 4/2002 | Thomas | |
| 6,605,343 B1 | 8/2003 | Motoi et al. | |
| 6,685,333 B1 | 2/2004 | Bieberdorf | |
| 6,692,183 B2 | 2/2004 | Godfrey | |
| 6,931,809 B1 | 8/2005 | Brown et al. | |
| 6,938,968 B2 | 9/2005 | Tanimoto et al. | |
| 6,972,144 B2 | 12/2005 | Roth et al. | |
| 7,219,479 B2 | 5/2007 | Durning et al. | |
| 7,358,280 B2 | 4/2008 | Berghmans et al. | |
| 7,401,998 B2 | 7/2008 | Wilson et al. | |
| 7,485,352 B2 | 2/2009 | Yuasa et al. | |
| 7,537,413 B1 | 5/2009 | Brugos | |
| 7,931,210 B1 | 4/2011 | Pike et al. | |
| 7,950,592 B2 | 5/2011 | Yuan | |
| 2002/0124531 A1 | 9/2002 | Mossbeck et al. | |
| 2003/0081999 A1 | 5/2003 | Godfrey | |
| 2003/0181536 A1 | 9/2003 | Roth | |
| 2003/0224675 A1 | 12/2003 | Yeh | |
| 2004/0172964 A1 | 9/2004 | Brachert et al. | |
| 2004/0176001 A1 | 9/2004 | Yeh | |
| 2004/0232254 A1 | 11/2004 | Kowalski | |
| 2005/0001048 A1 | 1/2005 | Skoblenick et al. | |
| 2005/0101201 A1 | 5/2005 | Yeh | |
| 2005/0188637 A1 | 9/2005 | Yeh | |
| 2005/0215138 A1 | 9/2005 | Yeh | |
| 2005/0272323 A1 | 12/2005 | Yeh | |
| 2006/0030467 A1 | 2/2006 | Mellott | |
| 2006/0078382 A1 | 4/2006 | Wilson et al. | |
| 2006/0105650 A1 | 5/2006 | Yeh | |
| 2006/0110993 A1 | 5/2006 | Yeh | |
| 2006/0131437 A1 | 6/2006 | Thiagarajan et al. | |
| 2006/0134401 A1 | 6/2006 | Yeh | |
| 2006/0223897 A1 | 10/2006 | Sasaki | |
| 2007/0015421 A1 | 1/2007 | Yeh | |
| 2007/0040293 A1 | 2/2007 | Lane et al. | |
| 2007/0160798 A1 | 7/2007 | Yeh | |
| 2008/0081153 A1 | 4/2008 | Yeh | |
| 2008/0083835 A1 | 4/2008 | Girardi et al. | |
| 2008/0125502 A1 | 5/2008 | Reichman et al. | |
| 2008/0142611 A1 | 6/2008 | Scobie | |
| 2008/0166539 A1 | 7/2008 | Yeh | |
| 2008/0242169 A1 | 10/2008 | Yeh | |
| 2008/0305304 A1 | 12/2008 | Yeh | |
| 2009/0100780 A1 | 4/2009 | Mathis et al. | |
| 2010/0028654 A1 | 2/2010 | Takase et al. | |
| 2010/0116180 A1 | 5/2010 | Roth et al. | |
| 2012/0031912 A1 | 2/2012 | Wang | |
| 2012/0102884 A1 | 5/2012 | Roberts, Jr. | |
| 2012/0104110 A1 | 5/2012 | Roberts, Jr. | |
| 2012/0328889 A1 | 12/2012 | Hayashi et al. | |
| 2013/0140860 A1 * | 6/2013 | Naughton et al. | 297/216.13 |

FOREIGN PATENT DOCUMENTS

| | | |
|---|---|---|
| JP | 59155443 | 9/1984 |
| JP | 59210954 | 11/1984 |
| JP | 60090744 | 5/1985 |
| JP | 06166112 | 6/1994 |
| JP | 07195536 | 8/1995 |
| WO | 9119867 | 12/1991 |
| WO | 2011103284 | 8/2011 |

OTHER PUBLICATIONS

ECE Agreement, Regulation No. 17, Jul. 31, 2002.*
Website www.jsp.com, 2006, "Arplank, Expanded bead foam packaging materials, Material Properties, Auto/Mil Specs." 21 Pages.
Website, Manning, www.mmh.com Oct. 2008, Retrived on Jan. 4, 2011, "Modern Materials Handling, Choosing Plastic." 2 Pages.
Website, Specter, www.mmh.com Sep. 2009, "Modern Materials Handling, The Rise of the Plastic Pallet." 4 Pages.

* cited by examiner

IN-SITU FOAM CORE VEHICLE SEATING SYSTEM AND METHOD OF MANUFACTURE

CROSS-REFERENCE TO RELATED APPLICATIONS

This application claims the benefit of U.S. Provisional Application No. 61/616,988 filed Mar. 28, 2012, the disclosure of which is incorporated in its entirety by reference herein.

TECHNICAL FIELD

The disclosed embodiments relate to an in-situ foam core vehicle seating system and method of manufacturing of same.

BACKGROUND

Vehicle manufacturers attempt to reduce the weight of the vehicles in order to enhance the fuel economy of the vehicle. Often the reduction in weight compromises the strength of component parts. Recently, regulations, such as ECE17 and Federal Motor Vehicle Safety Standards (FMVSS), such as FMVSS202A, have mandated a stiffer component structure for vehicle seats and greater energy absorption for associated seat headrests.

Recent components such as seat backs comprising a plastic blend of polycarbonate and acrylonitrile butadiene styrene (PC/ABS) have increased the cost of seat backs as well as increased the weight of the blowmolded polyethylene seat backs that they replaced. In other situations, headrests formed of polyurethanes foam failed the vertical height volumetric compression test as well as the deformation retention test.

SUMMARY

In at least one embodiment, a seating system for use with a vehicle includes a first seat component having a skin having a thermal bond to an in-situ foam core. The first seat component maximum displacement is less than 160 mm when tested according to a test method in ECE R17 regulation for luggage retention with a 20 times the force of gravity crash pulse.

In another embodiment, a seating system for use with a vehicle includes a first and a second seat back component portion having a skin having a thermal bond to an in-situ foam core and a periphery. The first seat back component portion and the second seat back portion component are disposed about a frame.

DETAILED DESCRIPTION

Figure 1:
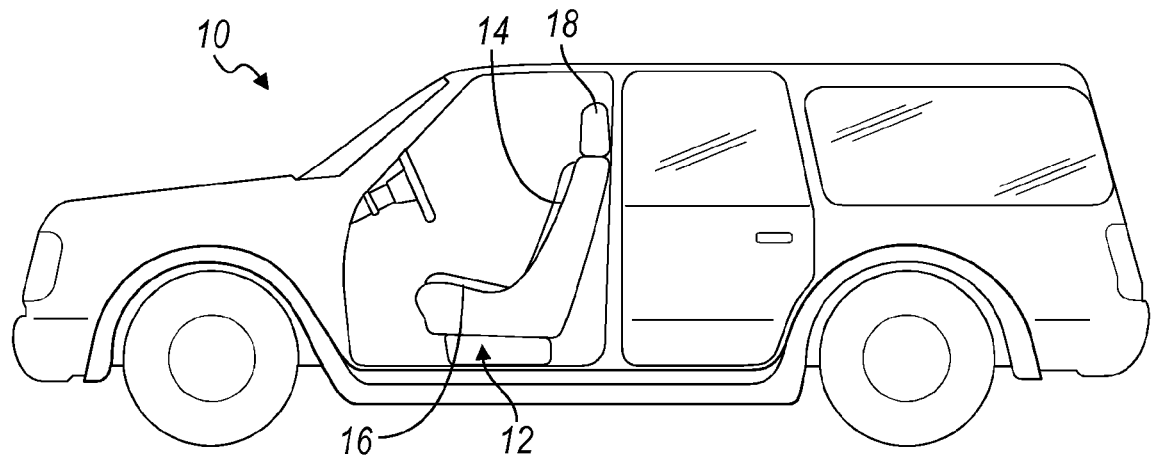
FIG. 1 schematically illustrates a vehicle having a seat assembly according to at least one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "terpolymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the," comprise plural reference unless the context clearly indicates otherwise. For example, the reference to a component in the singular is intended to comprise a plurality of components.

Throughout this application, where publications are referenced, the disclosure of these publications in their entirety are hereby incorporated by reference into this application to more fully describe the state-of-art to which the invention pertains.

FIG. 1 schematically illustrates a vehicle having a seat assembly according to at least one embodiment. A vehicle 10 has a seat assembly 12 including a seat back 14 and a seat base 16. Seat assembly 12 also includes a headrest 18.

Figure 2:
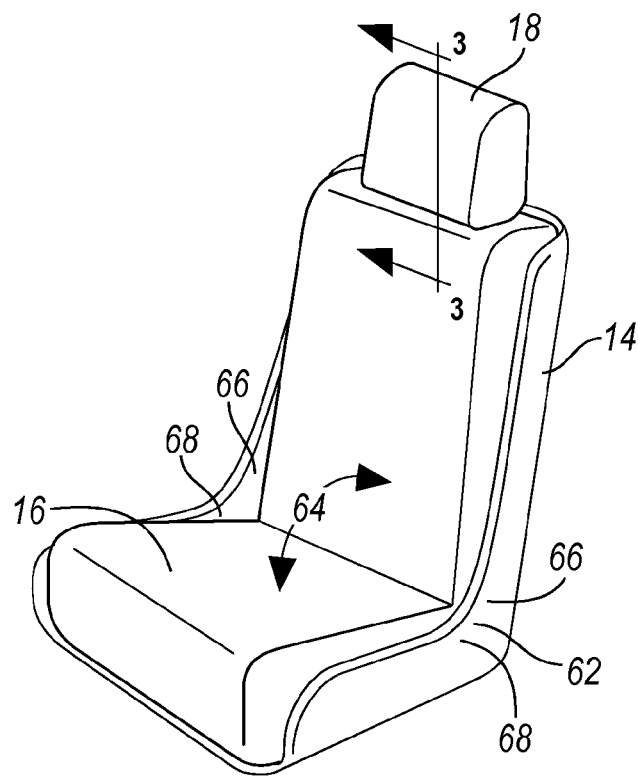
FIG. 2 schematically illustrates a seat back component and a headrest of a seat assembly according to at least one embodiment.

FIG. 2 schematically illustrates the seat back 14 and seat base 16 components and headrest 18 of seat assembly 12 according to at least one embodiment. Seat back 14 and seat base 16 include a skin 30 (see FIG. 3) and an in-situ foam core 32. In at least one embodiment, seat back 14 and seat base 16 are a unified component where the skin 30 is formed by a plastic processing technique, such as blowmolding, injection molding, and/or thermoforming. In another embodiment, seat back 14 and seat base 16 are separate components with each skin 30 formed by plastic processing technique, such as blow-molding, injection molding, and/or thermoforming, that are assembled into a single unit. In at least one embodiment, seat back 14 and seat base 16 are adjacent at an R point 62, the theoretical hip point used in designing a seat when the seat is set in the rearmost and lowermost seating position. In at least one embodiment, seat back 14 and seat base 16 intersect at a seat back end at an angle 64 creating an obtuse angle ranging from 10° to 30° beyond a vertical intersection between seat back 14 and seat base 16. It is understood that seat back 14 and seat base 16 when these skins are formed separately may be formed by identical or different plastic processing techniques.

Figure 3:
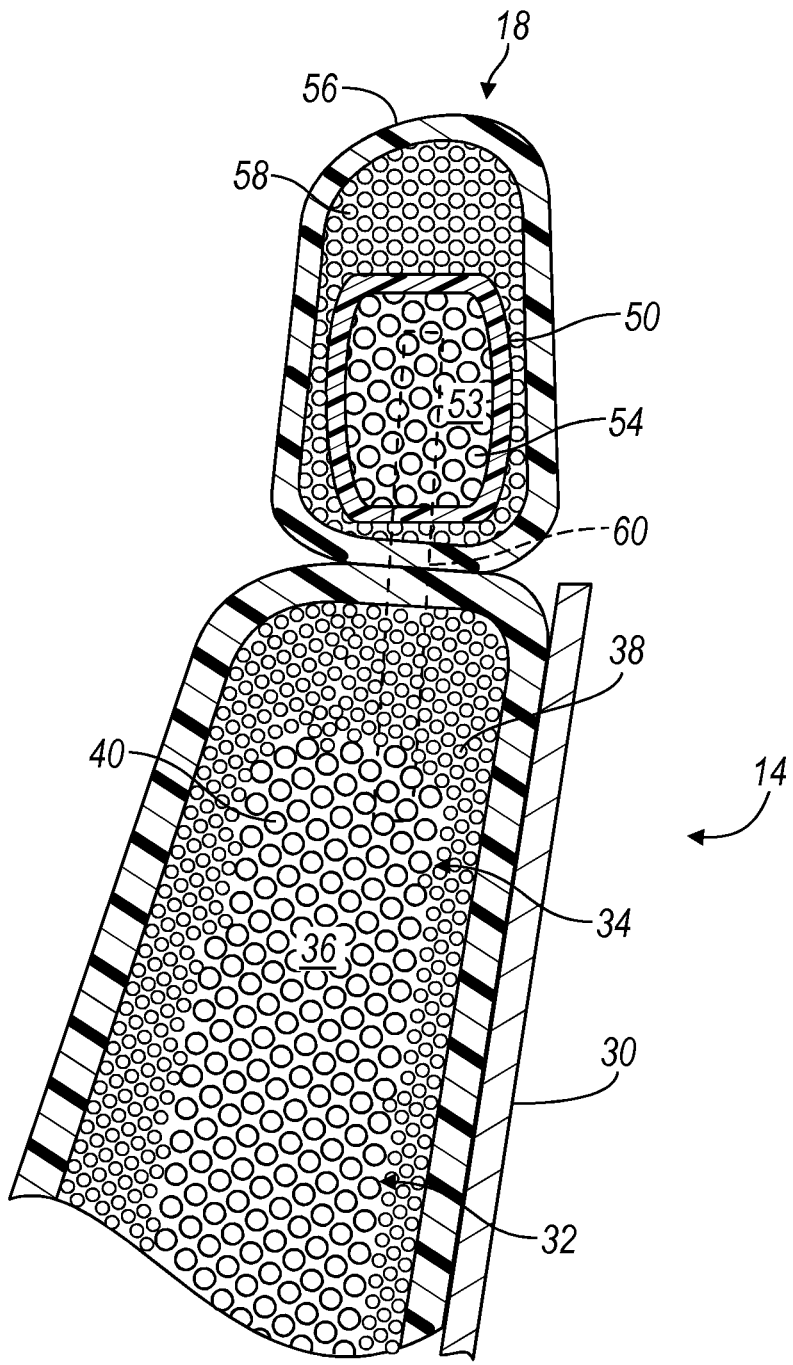
FIG. 3 schematically illustrates a fragmentary cross-sectional view of a seat back component and a headrest along axis 3-3 of FIG. 2 according to at least one embodiment.

FIG. 3 schematically illustrates a fragmentary cross-sectional view of seat back 14 component and headrest 18 along axis 3-3 of FIG. 2 according to at least one embodiment. Seat back 14 includes skin 30 which forms a cavity 36 into which in-situ foam core 32 is formed in at least one embodiment, the density of in-situ foam core 32 is of a single density. In another embodiment, in-situ foam core 32 is formed of pre-expanded beads 34 after they have been fully expanded and has a plurality of densities resulting from the use of a multiple sizes of pre-expanded beads. In-situ foam core 32 has a thermal bond to skin 30 during the expansion process. FIG. 3 schematically illustrates a higher density zone 38 and a lower density zone 40. It is advantageous to have a plurality of zones in order to tailor the necessary strength for the component as well as minimize use of materials and adding of weight. The thermal bond includes a portion of skin 30, a portion of in-situ foam core 32, and a co-mingled layer of a portion of skin 30 and a portion of in-situ foam core 32.

The steps of expanding the pre-expanded beads 20 are illustrated by U.S. patent application Ser. Nos. 13/358,181, 13/005,190, and 12/913,132 all of which are incorporated herein by reference.

Headrest 18, in at least one embodiment, includes a skin 50 formed by a plastic processing technique, such as blowmolding, injection molding, and/or thermoforming. Skin 50 forms a cavity 36 into which in-situ foam core 54 is injected. Skin 50 and in-situ foam core 54 are covered with a cover stock material 56 in certain embodiments. A chemically-blown or a physically-blown foam is positioned between cover stock material 56 and skin 50 forming a non-structural, flexible compressive foam component. In another embodiment, skin 50 and in-situ foam core 54 are coved with chemically-blown or physically-blown foam which is then bagged and exposed to a vacuum. Cover stock material 56 is applied about the foam 58. A stiffening rod 60 is inserted into headrest 18 and is connectable to seat back 14, in at least one embodiment.

In at least one embodiment, skin 30 thickness may range from 0.03 inches to 0.5 inches. In another embodiment, the thickness of skin 30 may range from 0.05 inches to 0.25 inches.

In at least one embodiment, in-situ foam cores 32 and/or 54 thickness may range from 0.15 inches to 6 inches. In another embodiment, in situ foam core 32 and/or 54 thickness may range from 0.2 inches to 4 inches. In another embodiment, in-situ foam core 32 and/or 54 thickness may range from 0.5 inches to 1 inch.

Skins 30 and/or 50, in at least one embodiment, are formed of a composition of any moldable composition. Non-limiting examples of the composition include, but are not limited to, a liquid silicone rubber, a synthetic rubber, a natural rubber, a liquid crystal polymer, a synthetic polymer resin, and a natural polymer resin. In another embodiment, skins 30 and/or 50 are formed of a composition of a thermoplastic polymer, a thermoset polymer, or blends thereof having a viscosity ranging from 0.1 grams/10 min to 40 grams/10 min. The viscosity is measured according to ASTM D-1238 at 190° C. with a 2.16 kg weight. In yet another embodiment, skins 30 and/or 50 are formed of a composition of a polyolefin including polypropylene and polyethylene having a viscosity ranging from 1 grams/10 min to 30 grams/10 min.

In-situ foam core 32 and/or 54, in at least one embodiment, are formed of a composition of any fluid-expandable material. Examples of fluid-expandable material include, but are not limited to, a polyolefin polymer composition, a biopolymer expandable bead, an alkenyl aromatic polymer or copolymer, a vinyl aromatic polymer resin composition, and a polystyrene polymer composition. In at least one embodiment, the polyolefin polymer composition includes polyolefin homopolymers, such as low-density, medium-density, and high-density polyethylenes, isotactic polypropylene, and polybutylene-1, and copolymers of ethylene or polypropylene with other: polymerized bull monomers such as ethylene-propylene copolymer, and ethylene-vinyl acetate copolymer, and ethylene-acrylic acid copolymer, and ethylene-ethyl acrylate copolymer, and ethylene-vinyl chloride copolymer. These polyolefin resins may be used alone or in combination. Preferably, expanded polyethylene (EPE) particles, cross-linked expanded polyethylene (xEPE) particles, polyphenyloxide (PPO) particles, biomaterial particles, such as polylactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially and/or wholly pre-expanded without exceeding the scope or spirit of the contemplated embodiments.

Pre-expanded bead 34, in at least one embodiment, is the resultant bead after raw bead has undergone a first expansion step of a two-step expansion process for beads. During the first expansion step, raw bead is expanded to 2% to 95% of the fully expanded bead size. The fully expanded bead is the bead that forms in-situ foam core 32. In another embodiment, pre-expanded bead 34 is result of the first expansion step where raw bead is expanded from 25% to 90% of the fully expanded bead size.

In at least one embodiment, pre-expanded bead 34 is re-compressed by 10 vol. % to 70 vol. % when being dispersed. Upon being dispersed, pre-expand bead 34 re-expands within the cavity 36.

A fluid for the second expansion step of the two-step expansion process for beads causes the pre-expanded beads to expand completely to form the fully expanded beads. Examples of the fluid include, but is not limited to, steam and superheated steam.

Polyolefin beads and methods of manufacture of pre-expanded polyolefin beads suitable for making the illustrated embodiments are described in Japanese patents JP60090744, JP59210954, JP59155443, JP58213028, and U.S. Pat. No. 4,840,973 all of which are incorporated herein by reference. Non-limiting examples of expanded polyolefins are ARPLANK® and ARPRO® available from JSP, Inc. (Madison Heights, Mich.). The expanded polypropylene, such as the JSP ARPRO$^{TS}$ EPP, has no external wall, such as skin 30.

In at least one embodiment, in-situ foam core 32 density, after expansion by steam such a such as in FIG. 1, ranges from 0.2 lb/ft$^3$ to 20 lbs/ft$^3$. In at least one embodiment, in-situ foam core 32 density, after expansion by steam such as in FIG. 1, ranges from 1 lbs/ft$^3$ to 15 lbs/ft$^3$. In at least one embodiment, in-situ foam core 68 density, after expansion by steam such as in FIG. 1, ranges from 2 lbs/ft$^3$ to 9 lbs/ft$^3$. In at least one embodiment, in-situ foam core 68 density, after expansion by steam such as in FIG. 1, ranges from 3 lbs/ft$^3$ to 6 lbs/ft$^3$.

Preferably, in at least one embodiment, steam-injected expanded polypropylene (EPP) has a density ranging from 0.2 lb/ft$^3$ to 20 lbs/ft$^3$. In yet another embodiment, steam-injected EPP may have a density ranging from 1 lbs/ft$^3$ to 10 lbs/ft$^3$. In yet another embodiment, steam-injected EPP may have a density ranging from 2 lbs/ft$^3$ to 6 lbs/ft$^3$. In yet another embodiment, steam injected EPP may have a density ranging from 3 lbs/ft$^3$ to 5 lbs/ft$^3$.

A passenger vehicle seat assembly, such as seat assembly 12, having a skin 30 of a polyethylene composition having a thickness ranging between 0.025 inches and 0.25 inches with in-situ foam core 32 density ranging from 1 lb/ft$^3$ to 5 lbs/ft$^3$ formed of expanded polyethylene (EPE) that was expanded using steam, passes ECE 17 are surprisingly reducing weight by 5 to 15 pounds relative to a PC/ABS 60/40 composition equivalent passenger vehicle seat assembly. Also, the passenger vehicle seat assembly of this embodiment, reduces weight of the seat assembly by 2 to 7 pounds relative to the blowmolded polyethylene equivalent passenger vehicle seat assembly that preceded the PC/ABS composition seat assembly. That blowmolded polyethylene seat assembly failed to pass ECE 17 testing.

In at least one embodiment, a skin with a range 0.025 inch thickness to 0.1 inch thickness composed of a metallocene polypropylene was found to improve adhesion between skin 30 and in-situ foam core 32 formed of EPP.

In at least one embodiment, an extrusion rate of a blowmolding parison is increased so as to increase the skin 30 thickness at the R point 62 by a range of 25% greater thickness to 100% greater thickness within a band across opposite sides 66 and 68 of seat back 14 and/or seat base 16, respectively, nearest the R point 62 at a distance of 3 inches.

In at least one embodiment, skin 50 of a polyethylene composition having a thickness ranging between 0.025 inches and 0.1 inches with in-situ foam core 32 density ranging from 1 lb/ft$^3$ to 5 lbs/ft$^3$ formed of expanded polyethylene (EPE) that was expanded in using steam, passes ECE 17.

It is understood that headrest 18 may be a passive headrest, remaining stationary during rapid deceleration. The passive headrest may be configured to remain within 0.25 inches to 1 inch of a vehicle occupant's head when the occupant is in the normal seated posture. It is also understood that headrest 18 may be an active headrest also described as an active head restraint, which may include an airbag within the area between cover stock material 56 and skin 50. In another embodiment, the active head restraint may actively move forward during rapid deceleration or a rear-end collision.

While seat assembly 12 is illustrated as a first row seat assembly, it is understood that seat assembly 12 maybe suitable for second and third row seat or a 60/40 row seat width distribution assemblies, in certain embodiments. Further, while seat assembly 12 is illustrated is having a headrest 18, in certain embodiments, headrest 18 is optional.

In at least one embodiment, seat assembly 12 is configured is the 60/40 rear seat with foam core seat back 14 that experiences a maximum longitudinal displacement of the outermost point of 160 mm when compared to a conventional blowmolded seat back which experiences a maximum longitudinal displacement of 176 mm when tested according to ECE R17 regulation for the luggage retention with a 20 times the force of gravity crash pulse. In another embodiment, the foam core seat back 14 experiences a maximum longitudinal displacement of the outermost point of 145 mm when compared to a conventional blowmolded seat back. This means that the seat assembly 12 is passing ECE R17 test by 99.9 mm or approximately 80 rel. % to 99.9 rel. % of the specification. By comparison to conventional blow molded seat backs, the passing margin ranges from 32 rel. % to 52 rel. % better.

In at least one embodiment, seat back 14 deforms beyond a seat's H point plane by a maximum of less than 30 mm relative to a test's H plane maximum allowable deformation of 100 mm when tested according to ECE R17 regulation for luggage retention with a 20 times the force of gravity crash pulse. In at least one embodiment, seat back 14 deforms a maximum of less than 20 mm. In yet another embodiment, seat back 14 deforms a maximum of less than 5 mm. Surprisingly, in yet another embodiment, seat back 14 deforms a maximum of less than 1 mm.

In at least one embodiment, seat assembly 12 distributes input energy at least 10 to 20 ms faster than conventional blowmolded seat assemblies, when measured according to Federal Motor Vehicle Safety Standard (FMVSS) 202A deceleration energy absorption analysis E. In at least one embodiment, an entire deceleration of FMVSS202A deceleration energy absorption analysis E for seat back 14 is complete within 80 ms. In at least one embodiment, the deceleration of FMVSS202A deceleration energy absorption analysis E for seat back 14 is 95% complete within 70 ms. Surprisingly, in yet another embodiment, the deceleration of FMVSS202A deceleration energy absorption analysis E for seat back 14 is 95% complete within 60 ms. In another embodiment, seat assembly 12 distributes input energy at least 10 relative percent to 25 relative percent faster than conventional blowmolded seat assemblies.

Figure 4:
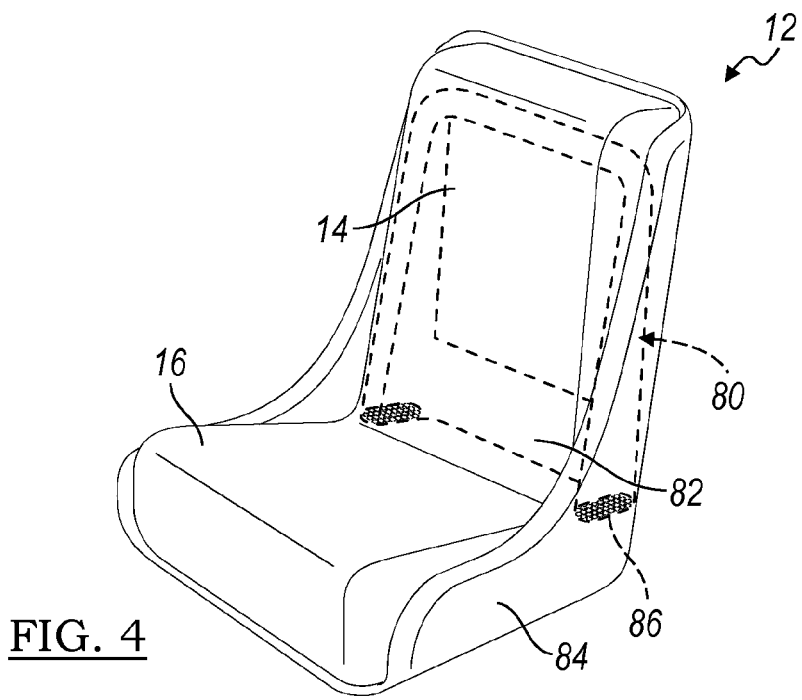
FIG. 4 schematically illustrates an isometric view of a seat assembly according to at least one embodiment.

In at least one embodiment, seat assembly 12 includes a wing 80 disposed along seat back 16 and intended to provide additional protection during crash pulses as schematically illustrated in at least one embodiment in FIG. 4. In at least one embodiment, the assembly 12 has a trim belt 82 disposed about a region of seat back 14 proximate to seat base 16 and the periphery of seat back 14. In at least one embodiment, trim belt 82 and wing 80 are unitized having a skin 84 including the thermal bond to an in-situ foam core 86.

Figure 5:
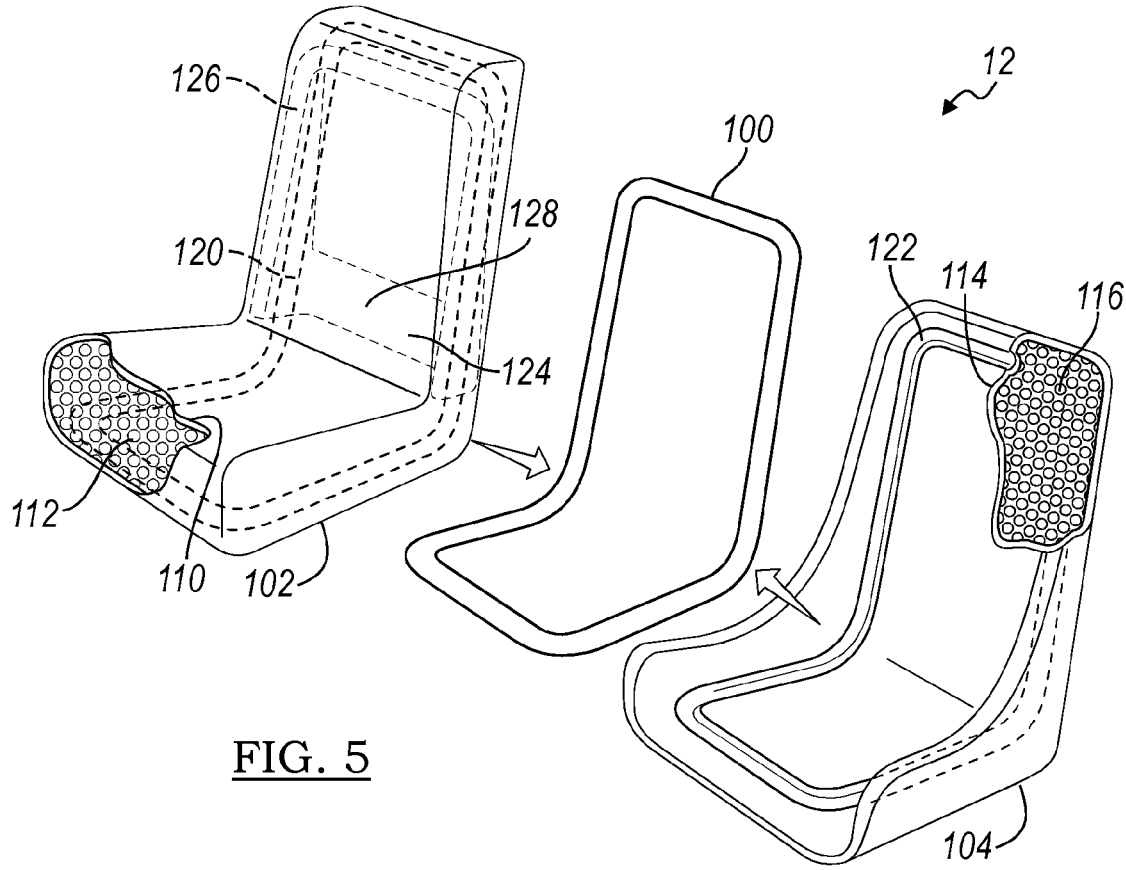
FIG. 5 schematically illustrates an exploded isometric view of a seat assembly according to another embodiment.

Turning now to FIG. 5, in at least one embodiment, seat assembly 12 includes a frame 100, a first seat component 102 and a second seat component 104. Seat component 102 includes a unitized molded component having a skin 110 and an in-situ foam core 112 including the thermal bond to skin 110. Second seat component 104 includes a unitized molded component having a skin 114 and an in-situ foam core 116 including the thermal bond to skin 114. In at least one embodiment, first seat component 102 includes a molded-in retention device 120 that cooperates with frame 100 to secure and/or position first seat component 102 on frame 100 during an assembly time period. Second seat component 104 includes a molded-in retention device 122 that cooperates with frame 100 to secure and/or position second seat component 122 on frame 100 adjacent to first seat component 102 during the assembly time period. It is understood that the assembly of first seat component 102 with frame 100 and second seat component 104 may be fastened together by means known in the art, such as, but not limited to, a screw 140, a bolt, and/or an adhesive.

Figure 6A:
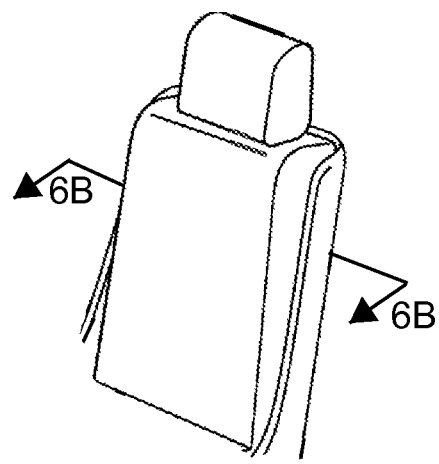
FIGS. 6A and 6B schematically illustrates a seat and a cross-sectional view of a seat back assembly according to at least one embodiment.
Figure 6B:
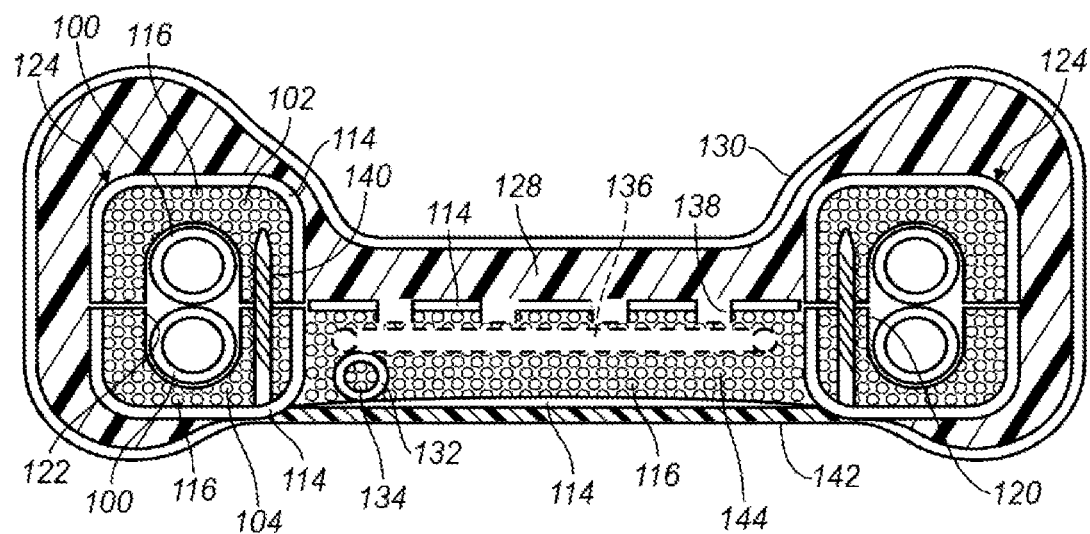

It should be understood that while illustrated in FIG. 6 as a solid cross-section, the cross-section is contemplated such that, in at least one embodiment, first seat component 102 and/or second seat component 104 comprise an annular ring. In another embodiment, first seat component 102 and/or second seat component 104 include straps disposed between portions of the annular ring.

In at least one embodiment, a trim belt 124 is molded as part of the first seat component 102. Trim belt 124 is disposed about wings 126 and a lumbar spine support region 128. It is understood that cushioning components, such as a polyurethane foam 128 may be applied to at least one of first or second seating components 102 or 104, respectively. In addition, in certain embodiments, an aesthetic cover 130 may be applied to at least one of first or second seating components 102 or 104, respectively, disposed either directly on at least one of first or second seating components 102 or 104, respectively, or on cushioning components.

In at least one embodiment, second seat component 104 includes a central portion 144 disposed between portions of trim belt 124. Central portion 144 includes at least one accessory module such as a molded-in module like a wireway 132 for seat back wires 134, a seat back environmental temperature control conduit 136 that is adjacent to at least one seat back environmental temperature control embossments 138 for use in transmitting hot or cold air from the conduit 136 and from foam 128 and aesthetic over 130.

In at least one embodiment, a cover plate 142 is adjacent to central portion 144 providing an aesthetic over as well as, optionally, amenities, such as a map pocket (not shown).

It is understood that while FIG. 5 illustrates a unified seat back 14 and seat base 16 in first seat component 102 and second seat component 104, segmented seat back 14 and seat base 14 are contemplated. For a non-limiting example, seat back 14 can have its own first seat back component and second seat back component that connect about the seat back frame in a manner analogous to first seat component 102 and second seat component 104 connect about frame 100.

While exemplary embodiments are described above, it is not intended that these embodiments describe all possible forms of the invention. Rather, the words used in the specification awards a description rather than limitation, and it is understood that various changes may be made without departing from the scope and spirit of the invention. Additionally, features of the various implementing embodiments may be combined to form further embodiments of the invention.

I claim:

1. A seating system for use with a vehicle having a seat with an H point plane, the system comprising:
a seat back having a skin having a thermal bond to an in-situ foam core, wherein the first seat component maximum displacement is less than 160 mm when tested according to a test method in an ECE R17 regulation for luggage retention with a 20 times the force of gravity crash pulse;
wherein the seat back deformation beyond the seat's H point plane is being a maximum of less than 30 mm relative to a test's H point plane maximum deformation when tested according to the ECE R17 regulation for luggage retention with a 20 times the force of gravity crash pulse.

2. The seating system of claim 1, wherein the seat back deceleration measured according to a method of FMVSS202A deceleration energy absorption analysis E is 95% complete within 80 ms.

3. The seating system of claim 1, wherein the seat back deceleration measured according to a method of FMVSS202A deceleration energy absorption analysis E is 95% complete within 60 ms.

4. The system of claim 1, wherein the seat back deceleration according to a method of FMVSS202A deceleration energy absorption analysis E is 95% complete within 70 ms.

5. The seating system of claim 1, wherein the skin comprises a thermoplastic plastic material and forms a cavity into which the in-situ foam core is formed.

6. The seating system of claim 5, wherein the in-situ foam core comprises a pre-expanded polymer beads disposed within the internal cavity and heated in place with hot gas so that the pre-expanded beads bond to one another and to the skin forming a thermal bond.

7. The seating system of claim 6, wherein the pre-expanded polymer beads are made of a metallocene polypropylene.

8. The seating system of claim 6, wherein the in-situ foam core has a density after expansion of 2 lb./ft$^3$ to 9 lb./ft$^3$.

9. The seating system of claim 6, wherein the pre-expanded polymer beads are made of a material selected from the group of polypropylene and polyethylene.

10. The seating system of claim 6, wherein the pre-expanded polymer beads are made of a material having a composition similar to that of the thermoplastic plastic shell.

11. The seating system of claim 6, wherein the skin has a thickness within the range of 0.025 to 0.100 inches.

12. The seating system of claim 6, wherein the in-situ foam core has a density after expansion of 1 lb./ft$^3$ to 5 lb./ft$^3$.

* * * * *